United States Patent [19]

Braun et al.

[11] Patent Number: 4,757,328

[45] Date of Patent: Jul. 12, 1988

[54] INK JET CHARGING PLANT AND DROP-CATCHER ASSEMBLY

[75] Inventors: Hilarion Braun, Xenia, Ohio; Evan L. Craig, Allentown, Pa.

[73] Assignee: Eastman Kodak Company, Rochester, N.Y.

[21] Appl. No.: 11,570

[22] Filed: Feb. 6, 1987

[51] Int. Cl.[4] .......................... G01D 15/18; B05B 5/00

[52] U.S. Cl. ........................................ 346/75; 239/693

[58] Field of Search ............................ 346/75; 239/693

[56] References Cited

U.S. PATENT DOCUMENTS

| | | | |
|---|---|---|---|
| 3,893,623 | 7/1975 | Toupin | 239/102 |
| 3,916,421 | 10/1975 | Hertz | 346/75 |
| 4,107,699 | 8/1978 | Kenworthy | 346/75 |
| 4,356,500 | 10/1982 | Graf | 346/75 |
| 4,489,894 | 12/1984 | Marchant et al. | 239/693 |
| 4,560,991 | 12/1985 | Schutrum | 346/75 |
| 4,591,869 | 5/1986 | Katerberg et al. | 346/1.1 |

*Primary Examiner*—E. A. Goldberg

*Assistant Examiner*—Gerald E. Preston

*Attorney, Agent, or Firm*—Dana M. Schmidt

[57] ABSTRACT

There is described a printing head useful in an ink-jet printer to print on a recording medium, comprising jet forming means for forming spaced drops of ink, charging means adjacent the forming means for inducing an electric charge in selected some of the drops, the charging means being mounted on an electrically non-conductive plate, and drop-catcher means for catching the charged drops. The drop-catcher means is integral with the plate mounting the charging means, and is disposed downstream from the charging means. The head is improved in that the drop-catcher means is provided with a face exposed to the drops that has a predetermined slope with respect to the jet stream of uncharged drops that provides a greater separation distance between the drop-catcher means and the uncharged drops, near the beginning of the stream, than such separation distance near the end of the stream adjacent the recording medium, and means at the edge of the face of the drop-catcher means, adjacent to the charging means mounting plate, for preventing build-up of ink adjacent that edge.

4 Claims, 1 Drawing Sheet

INK JET CHARGING PLANT AND DROP-CATCHER ASSEMBLY

FIELD OF THE INVENTION

This invention relates to a print head for an ink jet printer. More specifically, it relates to an improved assembly of a charging plate and a drop-catcher.

BACKGROUND OF THE INVENTION

Generally there have been two kinds of catcher-charge plate combinations in ink jet printing head relevant to a consideration of this invention. In one, the catcher has not been integral with the charge plate, but rather has been separated therefrom by an air gap. In this arrangement, the uppermost edge of the catcher that is closest to the oncoming jets or stream of drops has been horizontally set back from the operative charging surface of the charge plate, a variety of distances. Such a design is shown, e.g., in U.S. Pat. No. 4,107,699, FIG. 1.

In the other, the catcher and the charge plate are integral, providing certain advantages. One is that alignment of the two parts occurs automatically, so that there are no realignment adjustments when either part has to be replaced. A single heater can also be used to heat both parts, since they are integral. In such a design, there generally has been substantially no set back whatsoever, as described for the first design, of the uppermost edge of the catcher closest to the oncoming jets, relative to the operative charging surface of the charge plate. Such a design, although useful, has been found to have some drawbacks. For example, the lack of any setback tends to encourage arcing between the charge plate and the catcher, to the electrolytic detriment of both, and particularly the individual leads of the charge plate. In addition, the intercept face of the catcher has a negative slope, defined hereinafter. A negative slope tends to provide a catcher face that is parallel to the drops to be caught, thus necessitating a longer catching surface than would otherwise be the case. Such longer surface is disadvantageous both because of the additional distance the drops must travel to the paper being printed and because the collected ink film thereon is more susceptible to wide variations in thickness, than is a shorter length of collected film. That is, the longer catching surface produces a rapidly thinner coat as caught ink flow drops off when more ink is being printed. The thinning can cause drops intended to be caught, to be missed. Conversely, as the flow of caught drops increases, the volume of the film of ink tends to bulge too much, due to the increased length of catch surface, and interfere with print drops that are supposed to miss the catcher.

SUMMARY OF THE INVENTION

The present invention is directed to a catcher-charge plate combination that solves the problems of the lsat-described embodiment. It does so by using a differently-sloped catching surface on the catcher, and means for preventing a conductive path from catcher to charge plate.

More particularly, there is provided an ink jet printing head comprising forming means for forming a jet stream of spaced drops of ink that impact on a recording medium, charging means disposed adjacent the forming means for inducing an electric charge in selected some of the drops and not in the remainder, the charging means being mounted on an electrically non-conductive plate, and drop-catcher means for catching only the some drops bearing an induced charge, the drop-catcher means being (a) integral with the charging means mounting plate, and (b) disposed only downstream from the charging means, relative to the jet stream of drops. This printing head is improved in that the drop-catcher means is provided with a face exposed to the drops and having a predetermined slope with respect to the stream of the remainder drops that are uncharged, the slope providing a greater separation distance between the drop-catcher means and the remainder stream near the beginning of the remainder stream, than the separation distance between the drop-catcher means and the remainder stream near the end of the stream adjacent the recording medium, and means at the edge of the face adjacent to the charging means mounting plate, for preventing the build-up of ink adjacent the face edge.

Thus, it is an advantageous feature of the invention that electrolytic damage between the charge plate and the drop-catcher is minimized, without giving up the ability of the drop-catcher to support the charge plate by reason of the contact between the two.

It is a related advantageous feature of the invention that a charge plate-drop-catcher assembly is provided that avoids electrolytic damage to the assembly while still providing a thermally conductive path from the drop-catcher to the charge plate.

It is another advantageous feature of the invention that such an assembly is provided which allows the relatively flimsy charge plate to be referenced against a surface of the drop catcher, without features that tend to cause shorting of the charge plate.

It is another advantageous feature of this invention that the fringe field between charge plate and catcher is greatly reduced to avoid repelling charged drops, as would reduce catcher efficiency.

It is another related advantageous feature of the invention that build-up of ink such as can cause conductive paths from charge plate to drop-catcher, is avoided, without giving up desirable physical contact between the two components.

Yet other advantageous features will become apparent upon reference to the following description of the preferred embodiments, when read in light of the attached drawings.

DESCRIPTION OF THE PREFERRED EMBODIMENTS

Figure 1:
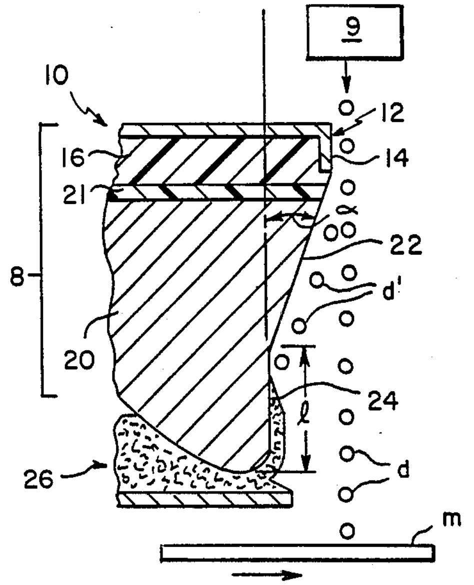
PRIOR ART FIG. 1
FIGS. 1 and 2 are fragmentary vertical section views of two different charge plate-drop-catcher assemblies of ink jet printers of the prior art.

The present invention is described in connection with its use in a continuous jet printer, the preferred usage. In addition, the invention is applicable to any kind of ink jet printer that uses a charging means and a drop-catcher means for catching the drops that are not to be printed.

The function of a charge plate and its assocaited catcher in a continuous jet printer is well-known, being described, e.g., in patents such as U.S. Pat. No. 4,591,869. That patent illustrates an assembly of the charge plate and the drop-catcher of the type 8 shown in FIG. 1 herein, wherein the overall charge plate generally labeled "10" is secured to the top of catcher 20 and in thermal contact therewith via a bonding layer 21. (Forming means 9 generates the drops in a conventional manner.) Plate 10 comprises charging face 12 wherein a plurality of charging electrodes 14 are embedded within a thermally conductive and electrically non-conductive material 16. Such a plate can be assembled, for example, in the manner described in U.S. Pat. No. 4,560,991. Catcher 20 comprises an exposed face 22 having a toe portion 24 on which the charged drops d' of ink are actually caught prior to being returned via passageway 26 to the printer. Because toe portion 24 has such a shallow angle of intercept with charged drops d', the length 1 of toe portion 24 is considerable to insure that all charged drops are caught. (The uncharged drops d pass on to recording medium m.) Such negative slope is depicted in FIG. 1 as having a clockwise angle alpha measured from a vertical plane drawn tangent to toe portion 24.

The assembly of FIG. 1 has the following advantages—plate 10 is supported by virtue of its contct with catcher 20, and is heated by the catcher by reason of the thermally conductive path so provided. It has as a disadvantage, the close proximity of conductive surface 22 to electrodes 14. Arcing tends to occur between the two at the slightest build-up of ink, causing the electrodes 14 to be eaten away.

Figure 2:
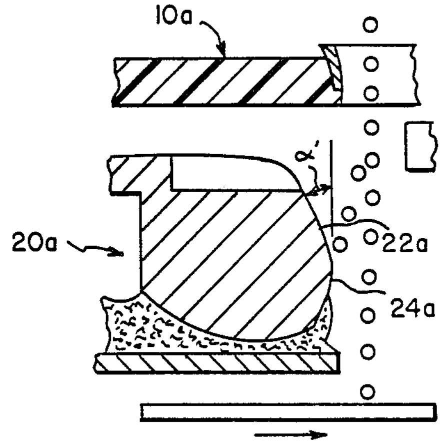
PRIOR ART FIG. 2

FIG. 2 illustrates another prior art continuous jet printer, wherein charge plate 10*a* is not actually assembled onto drop-catcher 20*a*. Instead, a gap is provided, to avoid the arcing problem mentioned above. Examples of such printers are shown in e.g., U.S. Pat. No. 4,107,699, FIG. 1. Such a drop-catcher 20*a* does provide an exposed face 22*a* that provides a positive angle alpha', measured from a vertical plane tangent to toe portion 24*a*. Such a construction, while avoiding arcing, is not able to use the drop-catcher as a support for the charge plate, nor as a heat source.

Figure 3:
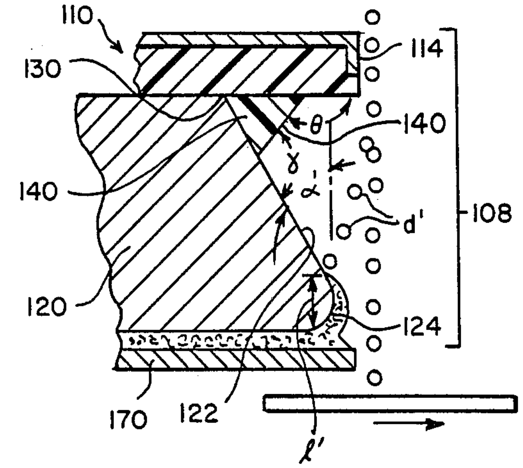
FIG. 3 is a fragmentary vertical section view similar to that of FIGS. 1 and 2, but of the present invention.

In accord with one aspect of the invention, the printer is constructed as shown in FIG. 3. Parts similar to those previously described in FIG. 1 are given the same reference numeral, but with 100 added. Thus, assembly 108 features a charge plate 110 secured to and in thermal contact with drop-catcher 120, much in the fashion shown in FIG. 1. The electrode 114 are constructed substantially identical to the embodiment of FIG. 1. Drop-catcher 120 is similar to that of FIG. 1, except that face 122 is provided with a positive slope, as measured by angle alpha', much like that of the embodiment of FIG. 2. Because toe portion 124 (used with trough 170 to collect the ink) presents a greater angle of interception with charged drops d', the vertical height 1' of toe portion 124 is less than height 1 of the embodiment of FIG. 1. For example, 1' can be 1.8 mm less than 1.

In accord with another aspect of the invention, face 122 has at its upper edge 130, namely the edge adjacent to the charge plate 110, means for preventing the build-up of ink in the area adjacent this edge. The preferred form of such means is a fillet 140 of an electrically non-conductive, but thermally conductive, material such as an epoxy resin or silicone sealant. The fillet in turn has a surface 144 that intersects both plate 110 and face 122 to form exterior angles theta and gamma, respectively. The purpose of fillet 140 is to fill in the dead air space that would otherwise form at the acute angle of intersect occurring at edge 130. It is such acute angles that tend to create dead air spaces, since it is difficult for circulating air to effectively clean such spaces out. As a result, ink tends to collect in the dead air spaces, which is not removed during routine cleaning operations. The ink eventually builds up to the point where, when wet, it acts as a shorting path between catcher 120, which is grounded, and electrodes 114. As used herein, "short" or "shorting" refers to any charge conduction that tends to detectably alter the charge on the electrodes from their optimum value. Not only does shorting induce electrolytic damage, but it also causes shut-down of the printer, since the printer monitors the charges on the electrodes to avoid attempted printing at inappropriate charge levels.

Thus, it is most preferred that the values of angles theta and gamma be greater than 90°. Except for this feature, the values of theta and gamma can vary widely. Preferred values include 120° and 150° respectively.

Figure 4:
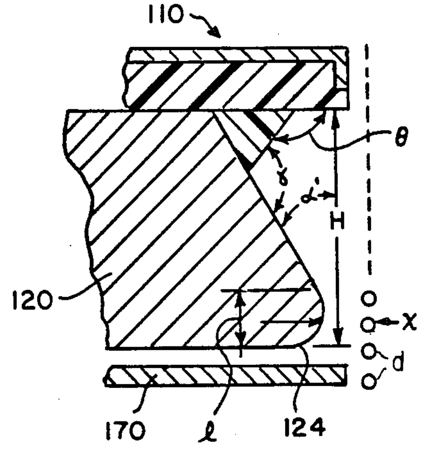
FIG. 4 is a fragmentary vertical section view generally identical to that of FIG. 3, but simplified to show certain geometrical aspects.

Referring now to FIG. 4, because 1' at toe portion 124 is reduced in value, as explained above, the overall vertical height H of drop-catcher 120 is also less than it otherwise would be. A typical preferred value for H is about 5 mm or less. Other dimensions appearing in that FIG., as preferred values, include $x \simeq 0.2$ mm, where x is the minimum spacing between uncharged drops d and the outer-most surface of toe portion 124, and alpha'=3° to 4°.

Still another alternative of the invention, not shown, is to construct surface 122 of nonconductive material, and to connect trough 170 to ground.

The invention has been described in detail with particular reference to preferred embodiments thereof, but it will be understood that variations and modifications can be effected within the spriit and scope of the invention.

What is claimed is:

1. In an ink jet printing head comprising forming means for forming a jet stream of spaced drops of ink that impact on a recording medium, charging means disposed adjacent said forming means for inducing an electric charge in selected some of said drops and not in the remainder, said charging means being mounted on an electrically non-conductive plate, and drop-catcher means for catching only said some drops bearing an induced charge, said drop-catcher means being (a) integral with said charging means mounting plate, and (b) disposed only downstream from said charging means, relative to said stream of drops, the improvement wherein said drop-catcher means is provided with a face exposed to said drops and having a predetermined slope with respect to the stream of said remainder drops that are uncharged, said slope providing a greater separation distance between said drop-catcher means and said remainder stream near the beginning of said remainder stream, than the separation distance between said drop-catcher means and said remainder stream near the end of said stream adjacent the recording medium.

and means at the edge of said face adjacent to said charging means mounting plate, for preventing the build-up of ink adjacent said face edge.

2. In an ink jet printing head comprising forming means for forming a jet stream of spaced drops of ink that impact on a recording medium, charging means disposed adjacent said forming means for inducing an electric charge in selected some of said drops and not in the remainder, said charging means being mounted on an electrically non-conductive plate, and drop-catcher means for catching only said some drops bearing an induced charge, said drop-catcher means being (a) integral with said charging means mounting plate, and (b) disposed only downstream from said charging means, relative to said stream of drops, the improvement wherein said drop-catcher means is provided with a face exposed to said drops and having a predetermined slope with respect to the stream of said remainder drops that are uncharged, said slope providing a greater separation distance between said drop-catcher means and said remainder steam near the beginning of said remainder stream, than the separation distance betwen said drop-catcher means and said remainder stream near the end of said stream adjacent the recording medium, and electrically non-conductive fillet material disposed at the angle of intersection between said charging means mounting plate and said drop-catcher means, said fillet material having an exposed surface that intersects said mounting plate and said catcher means to form exterior angles which are greater than 90°.

3. An ink jet printing head as defined in claim 1 or 2, wherein said drop-catcher means is spaced from the drops not caught by said drop-catcher means, a minimum distance of about 0.2 mm.

4. An ink jet printing head as defined in claim 1 or 2, wherein the vertical height of said drop-catcher means is about 5 mm.

* * * * *

UNITED STATES PATENT AND TRADEMARK OFFICE
CERTIFICATE OF CORRECTION

PATENT NO. : 4,757,328
DATED : July 12, 1988
INVENTOR(S) : Hilarion Braun and Evan L. Craig It is certified that error appears in the above-identified patent and that said Letters Patent are hereby corrected as shown below: Title page:

In the title "Plant" should read --Plate--.

Column 1, line 12 "head" should read --heads--.

Column 1, line 58 "lsat-" should read --last- --.

Column 3, line 27 "contct" should read --contact--.

Signed and Sealed this

Twenty-ninth Day of November, 1988

*Attest:*

DONALD J. QUIGG

*Attesting Officer*

*Commissioner of Patents and Trademarks*